United States Patent
Steets et al.

(10) Patent No.: US 7,995,469 B2
(45) Date of Patent: Aug. 9, 2011

(54) SYSTEM AND METHOD FOR PROVIDING INTELLIGENT QUALITY OF SERVICE MANAGEMENT IN A SYSTEM WITH A PLURALITY OF TELECOMMUNICATION CONNECTIONS

(75) Inventors: Andrew W. Steets, Austin, TX (US); Todd L. Mathis, Austin, TX (US); Mathew M. Krenzer, Cedar Park, TX (US); Patrick W. Lea, Austin, TX (US)

(73) Assignee: Wayport, Inc., Irving, TX (US)

( * ) Notice: Subject to any disclaimer, the term of this patent is extended or adjusted under 35 U.S.C. 154(b) by 327 days.

(21) Appl. No.: 11/943,779

(22) Filed: Nov. 21, 2007

(65) Prior Publication Data

US 2008/0123661 A1    May 29, 2008

Related U.S. Application Data

(60) Provisional application No. 60/866,711, filed on Nov. 21, 2006.

(51) Int. Cl.
*H04L 12/26* (2006.01)
(52) U.S. Cl. ......................................................... 370/225
(58) Field of Classification Search .................. 370/216, 370/217, 221, 225–228, 351–360; 709/238–240
See application file for complete search history.

(56) References Cited

U.S. PATENT DOCUMENTS

| | | | | |
|---|---|---|---|---|
| 5,796,718 | A * | 8/1998 | Caterisano | 370/217 |
| 6,337,846 | B1 * | 1/2002 | Bengston et al. | 370/216 |
| 6,473,863 | B1 * | 10/2002 | Genty et al. | 726/3 |
| 6,704,282 | B1 * | 3/2004 | Sun et al. | 370/237 |
| 6,813,241 | B1 * | 11/2004 | Wang et al. | 370/228 |
| 6,915,463 | B2 * | 7/2005 | Vieregge et al. | 714/704 |
| 6,925,054 | B1 * | 8/2005 | Atterton et al. | 370/218 |
| 6,940,808 | B1 * | 9/2005 | Shields et al. | 370/216 |
| 6,965,775 | B2 * | 11/2005 | Antoniou et al. | 455/450 |
| 7,590,055 | B2 * | 9/2009 | Segel | 370/228 |
| 2005/0021844 | A1 * | 1/2005 | Puon et al. | 709/238 |
| 2006/0002292 | A1 * | 1/2006 | Chang et al. | 370/225 |
| 2006/0089121 | A1 * | 4/2006 | Elgebaly et al. | 455/410 |

OTHER PUBLICATIONS

PCT/US07/85337 PCT International Search Report, Mar. 7, 2008.

* cited by examiner

*Primary Examiner* — Dmitry H Levitan
(74) *Attorney, Agent, or Firm* — Yudell Isidore Ng Russell PLLC

(57) ABSTRACT

A method, a system, and a computer program product that enables real-time, intelligent quality of service (QoS) for essential services being accessed and/or utilized by a back-office device via a secondary connection to a back-office server running the back-office application/service. A network management device (NMD) executes a QoS utility that responds to a detection of the failure of a primary connection to the back-office server by establishing a secondary connection and providing optimal QoS for the essential services on the secondary connection, in real time.

21 Claims, 6 Drawing Sheets

SYSTEM AND METHOD FOR PROVIDING INTELLIGENT QUALITY OF SERVICE MANAGEMENT IN A SYSTEM WITH A PLURALITY OF TELECOMMUNICATION CONNECTIONS

PRIORITY CLAIM

Benefit of priority under 35 U.S.C. §119(e) is claimed based on U.S. Provisional Application No. 60/866,711, entitled, "System and Method for Providing Intelligent Quality of Service Management in a System with a Plurality of Telecommunication Connections," filed on Nov. 21, 2006, which disclosure is incorporated herein by reference.

BACKGROUND

1. Field of Art

The illustrative embodiment of the present invention relates generally to electronic networks and in particular to a method and system for providing quality of service (QoS) during network communications.

2. Description of the Related Art

Public access over network connections to Internet sites that provide publically available applications is well known. Several Internet service providers (ISPs) provide access to their services at public venues such as hotels, airports, restaurants, and similar public locations, generally referred to as "hot-spots". ISPs may also provide distributed access in metropolitan area networks or other venues. The access control to the ISP sites is typically provided via a network distribution unit (NDU), such as a wired or a wireless access point installed at the location. A customer then uses a personal computing device (PCD) such as a laptop or other WiFi-ready or internet-ready device (e.g., a handheld computer, a gaming device, or "Wi-Fi" phone) to connect to the NDU and gain access to the ISP.

In addition to the use of the Internet and PCD to access public application, many customers desire to run "back-office", private applications from back-office devices. These devices often require connection to the Internet to connect to back-office servers that are located off-site. Some examples of common types of back office applications are credit card, debit card, and/or gift-card processing, wherein the customer's card information is electronically transmitted to a central gateway (processing facility) to validate and apply charges to the card. As another example, a centralized ordering system running over VoIP (voice over internet protocol) may transmit voice data to a centralized call-center for taking orders. Other examples of back-office devices (and applications) include DVD rental stations, electronic-learning stations, inventory and monitoring systems, and video surveillance systems.

Ideal connections between the back-office devices and the back-office servers may require specific quality of service (QoS), such as guaranteed bandwidth, guaranteed latency, minimum jitter, and the like. These back-office devices connect to the back-office servers using a primary connection mechanism, which typically provides a desired level of quality of service (QoS). For example, the primary connection may be completed using a primary connection modem, such as DSL, cable modem, or T-1, which has pre-set connection parameters and QoS considerations. In some instances, the conventional back-office applications may provide a back-up connection to the Internet, available via an alternate modem/router, in addition to the primary connection modem. Thus, if the primary connection fails, the alternate connection, which offers lower levels of QoS, can be used to transmit information and ensure continued service, albeit at the lower QoS level.

Generally with some types of Internet access, e.g., access at/from distributed locations, the access provider typically provides support for different services, which each require different QoS parameters, such as minimum bandwidth, guaranteed latency, minimum jitter, and the like. For example, voice applications require guaranteed bandwidth and low-latency. As another example, card processing requires guaranteed bandwidth.

Conventional QoS measures are pre-determined for each connection type and do not typically correlate to the actual service being accessed by the connection. Thus, if a service is switched from a primary connection to a secondary connection, such as during a loss of connectivity on the primary connection, the service encounters a reduction in QoS to that of the secondary connection.

In addition, certain ones of these applications may need to run inside of a virtual private network (VPN) tunnel that is connected from a VPN client to a VPN tunnel aggregator. The VPN tunnel aggregator terminates all of the VPN tunnels and routes the traffic to a VPN tunnel handoff router, where the traffic is routed to various back-office application servers. However, when an application/service switches from the primary connection to the secondary connection, the VPN connection is lost, and has to be manually re-established.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF PREFERRED EMBODIMENTS

Figure 1:
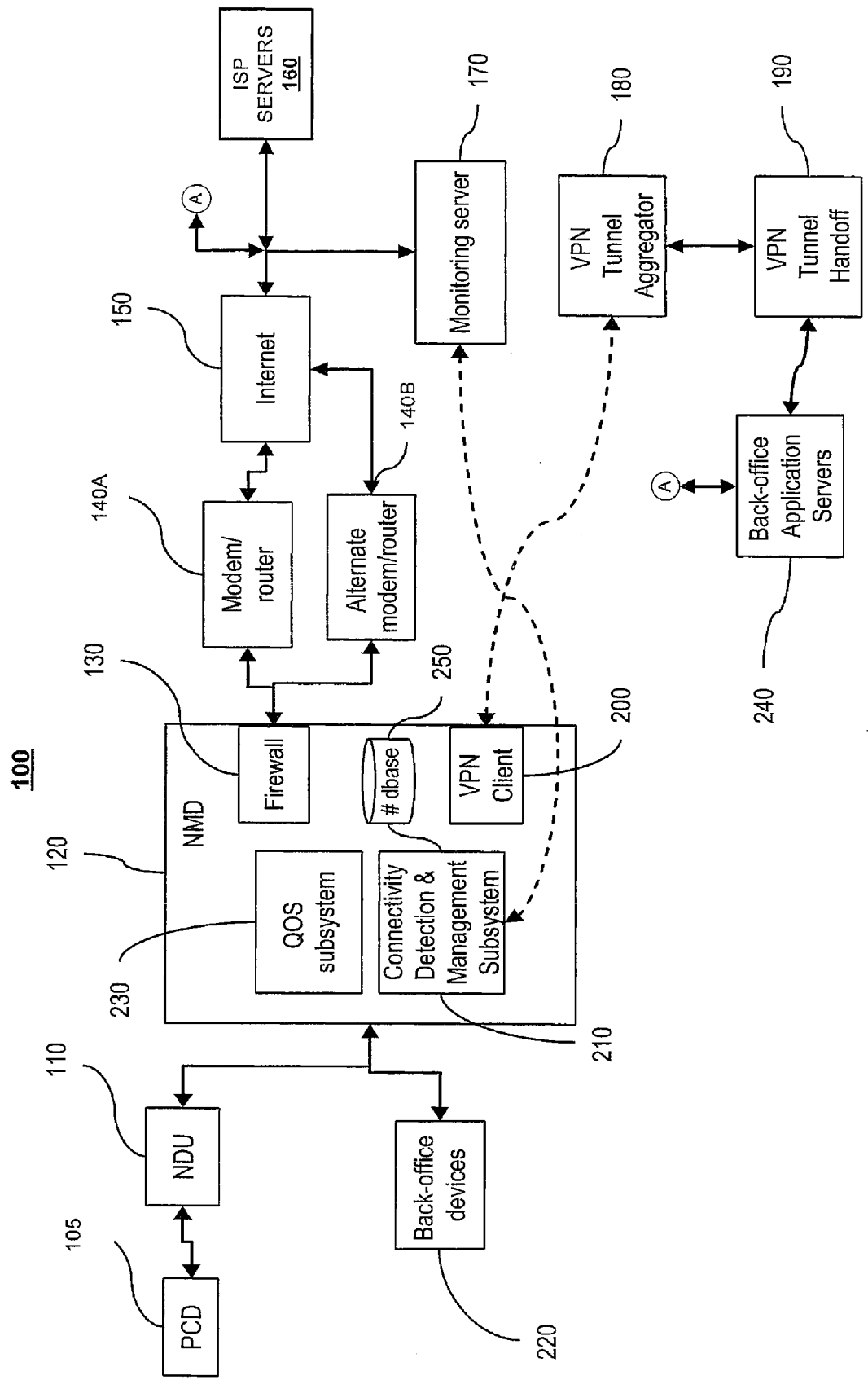
FIG. 1 illustrates an example network within which the features of the invention may advantageously be implemented, in accordance with one embodiment of the invention.

According to the illustrative embodiments, a method, a system, and a computer program product are provided to enable real-time, intelligent quality of service (QoS) for essential services being accessed and/or utilized by a back-office device via a secondary connection to a back-office server running the back-office application/service. A network management device (NMD) executes a QoS utility that responds to a detection of the failure of a primary connection to the back-office server by establishing a secondary connection and providing optimal QoS for the essential services on the secondary connection, in real time.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, and particularly FIG. 1 which depicts an example distributed network within which the features of the invention are advantageously applied to provide real-time, intelligent QoS for essential back-office applications/services being utilized by back-office devices accessing one or more back-office servers. Network 100 comprises a plurality of interconnected components, and is described according to the connectivity of each component to each other and the functionality provided by the various connections.

As shown, network 100 includes a public access sub-network in which Internet Service Providers (ISPs) provides ISP servers 160 to which a personal computing device (PCD) 105 of a customer connects through one or more network distribution units (NDU) 110. PCD 105 may be a laptop or other internet-ready device, such as a handheld computer, a gaming device, or "Wi-Fi" phone. NDU 110 represents a wired or a wireless access point at the particular location. The ISP has an access control gateway, network management device (NMD) 120, which controls whether the user is allowed to connect to the Internet 150. In the illustrative embodiment, the NMD 120 controls the connection through a firewall 130 that blocks access to the Internet 150 until the customer (a) pays for the internet access and/or (b) agrees to provided terms of use.

In addition to the public access applications, network also supports "back-office", private applications by which back-office devices 220 connect to back-office servers 240 via the Internet 150. According to one aspect of the invention, connections between the back-office devices 220 and the back-office servers 240 require specific quality of service (QoS), such as guaranteed bandwidth, guaranteed latency, and other QoS parameters. QoS for the back-office application is controlled by QoS subsystem 230, which is a utility that runs on network management device (NMD) 120. As further illustrated, one or more of the back-office applications may run inside of a virtual private network (VPN) tunnel that is connected from VPN client 200 to VPN tunnel aggregator 180. VPN tunnel aggregator 180 terminates all of the VPN tunnels and routs the traffic to VPN tunnel handoff router 190, from which the traffic is routed to various back office application servers 240.

In addition to the primary connection modem 140A (e.g. DSL, cable modem, or T-1) to the Internet 150, NMD 120 also provides or is connected to a secondary (or alternate) modem/router 140B, which serves to provide a back-up connection to the Internet and the back-office applications. Secondary modem/router 140B is utilized by NMD 120 if (or whenevever) the primary connection fails, to transmit information and maintain the services, particularly the essential services.

Figure 2:
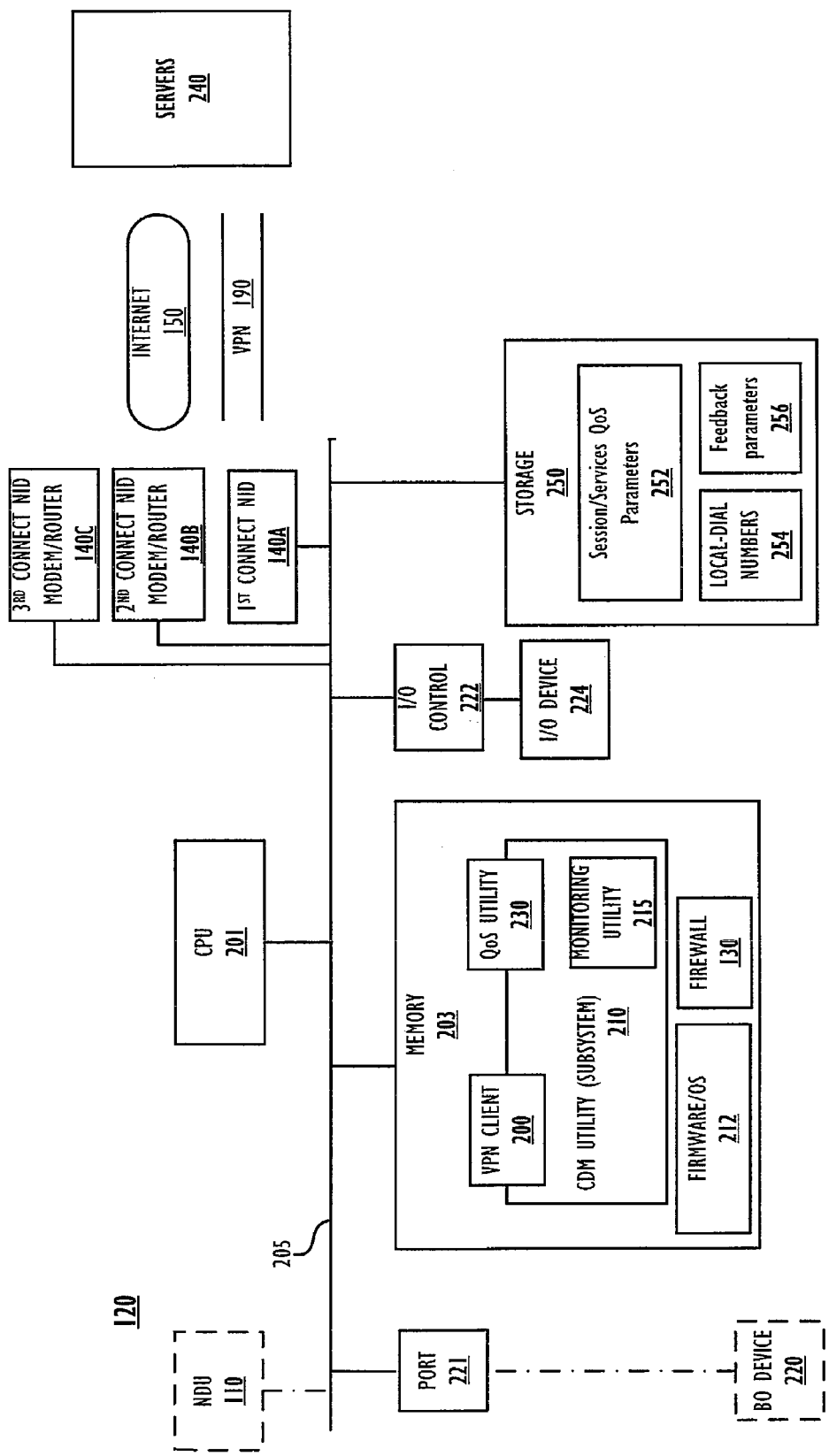
FIG. 2 is a more detailed block diagram of a network management device, having hardware and software components for implementing one or more embodiments of the invention.

Network 100 and specifically NMD 120 also comprises several other components/devices. These components are illustrated in FIG. 2, and described in the FIG. 2 description below. With specific reference now to FIG. 2, there is illustrated a more detailed block diagram representation of an example NMD 120, according to one embodiment of the invention. NMD 120 comprises at least one processor or central processing unit (CPU) 201 connected to system memory 203 via system interconnect/bus 205. System memory 203 may include, but is not limited to, cache memory, registers, and buffers. Also connected to system bus 205 is I/O control 222, which provides connectivity and control for I/O devices 224. Port 221 is also coupled to system bus 205 and provides connectivity for a back-office device, represented by dashed box 220. Also shown as a dashed box is NDU 110, which may connect directly to system bus 205 of NMD 120 or connect via some other connection method.

NMD 120 also comprises storage 250 (also referred to as database 250 in FIG. 1), within which data/instructions/code may be stored. Among the code stored within storage 250 are session/service QoS parameters 252, which is a list of the various QoS parameters applicable to each service that is supported by the NMD 120 or the back-office applications, Local dial numbers 254, which is a collection of telephone numbers and/or access information for secondary modem connection to the Internet, and feedback parameters 256, which are certain QoS parameters and thresholds used to inform NMD when to adjust connection parameters (e.g., bandwidth allocation) based on the services being supported.

NMD 120 is also illustrated with a plurality of network interface/access devices, coupled to system bus 205. Among these network interface/access devices are primary connection device 140A, second connection device 140B, and third connection device 140C. These connection devices may be a modem or router, each with different connection parameters and different QoS parameters. For purposes of the described embodiments, primary connection device 140A is assumes to provide optimal QoS for the various services (both essential and non-essential) being supported and/or utilized by NMD 120. Also, second and third connection devices 140B and 140C are assumed to have lower QoS parameters (lower bandwidth, higher latency, etc.) relative to primary connection device 140A. These connection devices enable NMD 120 to connect to one or more (back-office) servers 240 via a network, such as the Internet 150. Additionally, NMD 120 is able to connect to servers 240 via virtual private network (VPN) 190.

In the described embodiments, Internet 150 is a worldwide collection of networks and gateways that utilize the Transmission Control Protocol/Internet Protocol (TCP/IP) suite of protocols to communicate with one another. Of course, network access may also be provided via a number of different types of networks, such as an intranet, a local area network (LAN), or other wide area network (WAN) other than the Internet, for example.

Those of ordinary skill in the art will appreciate that the hardware depicted in FIG. 1 is a basic illustration of an NMD and connections to other devices, and thus the hardware utilized in actual implementation may vary. Thus, the depicted example is not meant to imply architectural limitations with respect to the present invention.

Notably, in addition to the above described hardware components of NMD 120, various features of the invention are completed via software (or firmware) code or logic stored within memory 203 or other storage (e.g., storage 250) and executed by CPU 201. In one embodiment, data/instructions/code from storage 250 populates the system memory 203, which is also coupled to system bus 105 on initial boot up of NMD 120. Thus, illustrated within memory 203 are a number of software/firmware components, including firmware/OS (or operating system) 212, firewall 130, CDM utility 210, QoS utility 230, monitoring utility 215, and VPN client 200.

In actual implementation, QoS utility 230 and monitoring utility 215 may be provided as components of CDM utility 210, i.e., as a single application collectively providing the various functions of each individual utility, when the corresponding code is executed by the CPU 201. Thus while illustrated as separate components, for simplicity, CDM utility 210, QoS utility 230 and monitoring utility 215 are collectively described combined software/firmware component, which is stored in system memory 203 to provide/support the specific novel functions described herein.

Among the software code/instructions provided by CDM utility 210, and which are specific to the invention, are: (a) code for detecting and verifying a failure of a first connection to a back-office server; (b) code for responding to the failure by activating a second connection and routing essential services on the second connection; and (c) code for evaluating the QoS parameters of the second connection relative to the QoS requirements of the essential services and making intelligent, real-time adjustments to the routing characteristics on the second connection to provide optimal QoS for the essential services. CPU 201 executes the above code of CDM utility 210. According to the illustrative embodiment, when CPU 201 executes CDM utility 210, NMD 120 initiates a series of functional processes that enable the above functional features as well as additional features/functionality, which are described below within the description of FIGS. 3-4.

Those of ordinary skill in the art will appreciate that the hardware and basic configuration depicted in FIG. 2 may vary. For example, other devices/components may be used in addition to or in place of the hardware depicted. The depicted example is not meant to imply architectural limitations with respect to the present invention.

The present invention was conceived based on the recognition that the current state of the art in providing back-office applications/services has several limitations. For example, in many circumstances, only manual detection of a failed connection is supported. Also, a failure response that involves switching over to an alternate (e.g., second) connection is also performed manually.

Also, IP data service providers typically provide several services over a single internet communications channel. For example, the provider may deliver public services such as Wi-Fi, content, and gaming, as well as business-critical "back-office" services such as credit card processing, VoIP, and the like. When the primary communication channel is unavailable due to various problems on the network, the provider may provide a backup channel, potentially using a slower speed or services-restricted connection.

Additionally, the quality of service requirements for the various services supported by the NMD 120 is not enforced for different applications across the different connections. Thus, for example, a customer connects both private applications and public applications to a switch or hub receives no differentiation between the quality of service offered for either applications.

The invention recognizes that, when an alternate connection is used, a very different set of QoS parameters may be required due to lower bandwidth and other differences in the connection characteristics. For example, in the case of a dial-backup modem being used as the alternate connection to a primary DSL line, bandwidth may drop from a megabit/sec to 56 kilobits/sec or less. With conventional systems, no support is provided to change the QoS parameters to ensure that critical applications still function properly under this lower bandwidth circumstance. In addition, manual intervention is required to re-establish the VPN tunnel. The embodiments described herein substantially eliminate the above limitations and provide for a better overall experience to the user via real-time, intelligent bolstering of the QoS provided for services on the existing connection.

Described embodiments of the present invention utilize a detection mechanism for down channel detection of connection failures. The embodiments further provide a novel application prioritization and QoS mechanism to ensure that mission critical (i.e., essential) applications still work in an alternate communications channel mode. Moreover, where the applications require an encrypted channel such as a VPN, embodiments of the present invention provides a mechanism for automatically re-establishing a VPN connection upon establishing the alternate channel communication path.

Embodiments of the invention also account for situations where the connection technology, such as with cable modems, does not provide guaranteed bandwidth and/or other QoS parameters. With connection devices that utilize these types of connection technology, the CDM utility 210 is configured to sense the bandwidth, latency and jitter of each of the connections on a periodic basis and make appropriate changes to the QoS subsystem 230 in order to ensure that all services are functioning properly and with the optimal QoS.

Figure 3:
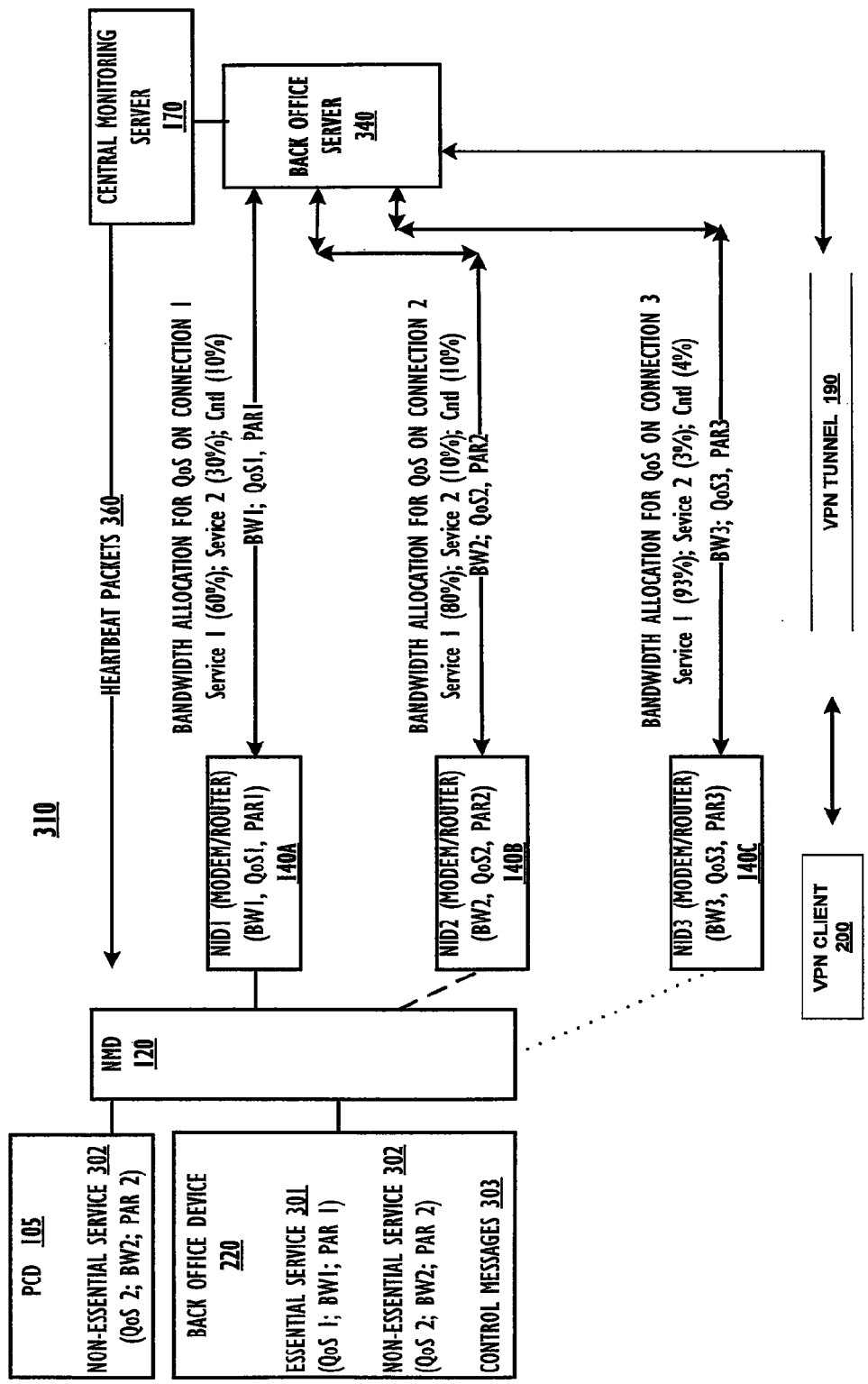
FIG. 3 illustrates an operational set of device connections utilized to ensure connectivity for a back-office application/service from a back-office devices to a back-office server, while providing real-time, intelligent Quality of Service (QoS), in accordance with one embodiment of the invention.

FIG. 3 illustrates a variable connection QoS diagram 300 linking the NMD 120 with the back-office server 340 via three alternate connection paths, each providing different QoS characteristics and/or parameters. As shown, NMD 120 supports access by/for multiple services of connected devices, of which back-office device 220 and PCD 105 are illustrated. Example services, shown in back-office device 220 include essential service1 301, having a first set of QoS requirements (QoS characteristics or parameters), which may include bandwidth and other connection and/or communication parameters. Example services also include non-essential service2 302, which also has its own (second) set of QoS requirements, such as bandwidth and other connection and/or communication parameters. Finally, some control messages are also provided and transmitted over the connection by the NMD 120. Control messages may originate from the NMD 120 itself.

NMD 120 provides a first connection to back office server 340 via primary network connection device (modem/router) 140A, which supports/provides a first QoS, including bandwidth allocation for the essential and non-essential services being supported by NMD 120. The QoS bandwidth allocation is indicated within the dashed box above the first connection path. As shown, service 1 is provided 60% of the bandwidth, non-essential services are provided 30% of the bandwidth and control messages are provided with 10% of the bandwidth on the primary connection.

NMD 120 also provides backup or alternate connections to back office server 340. Specifically, second network connection device 140B and third network connection device 140C are illustrated and support respective connections to back-office server 240, with each connection having/providing unique QoS characteristics for that connection. Ideally, CDM utility 210 triggers the allocation of bandwidth on each of the connections based on the needs of the service being supported and the type of QoS guarantees available via that connection or the connection device. As an example, when second connection device 140B is being used, and provides a lower bandwidth than the primary connection device 140A, CDM utility 210 operates to allocate a larger percentage of the overall bandwidth available on second connection to the essential services and reduces the amount of overall bandwidth provided to non-essential services. While each allocation across each connection is shown to add up to 100 percent, it is understood that this is for illustration only and that the allocations may not add up to a full 100% of the available bandwidth. Also, while the increase in bandwidth is shown as a percentage, it is also understood that an absolute value of required bandwidth may be used, in lieu of a percentage. Thus, an essential service may require 56 kbits/second rate transfer to function properly, regardless of the total amount of bandwidth available on the connection.

Figure 4A:
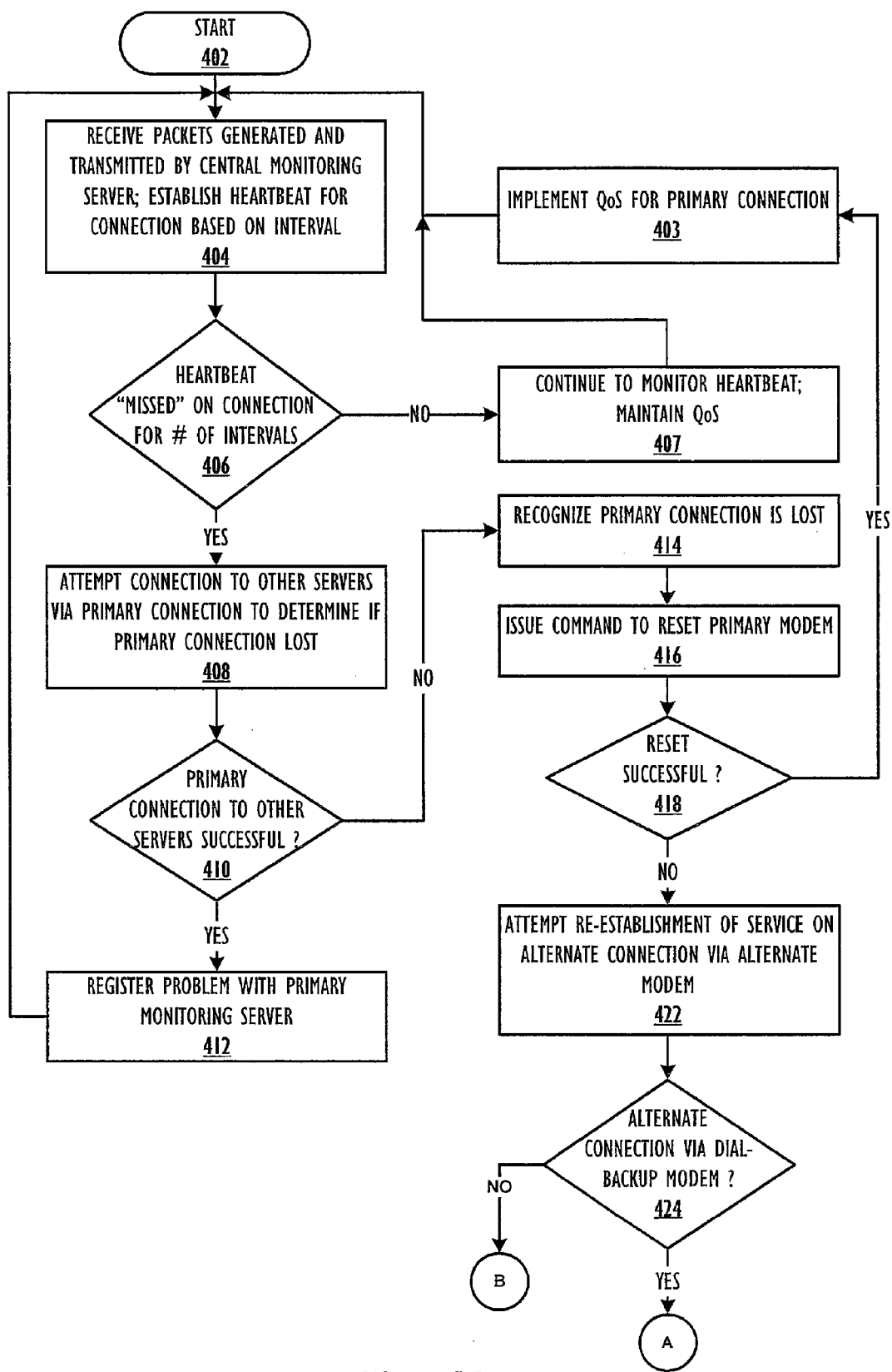
FIG. 4 (A-C) is a flow chart of the process by which the real-time/intelligent QoS and other features of the invention are implemented, according to one embodiment of the invention.
Figure 4B:
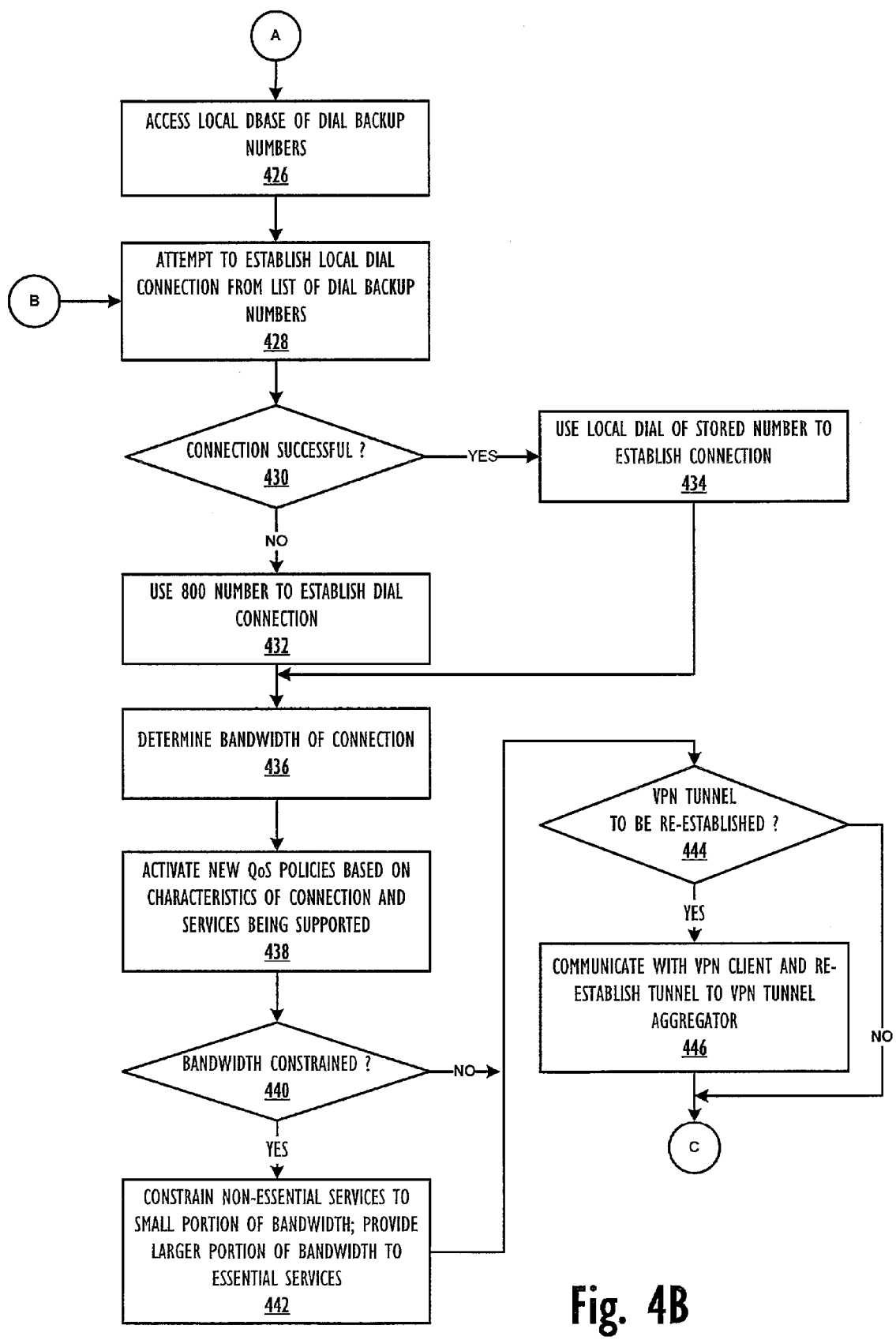
Figure 4C:
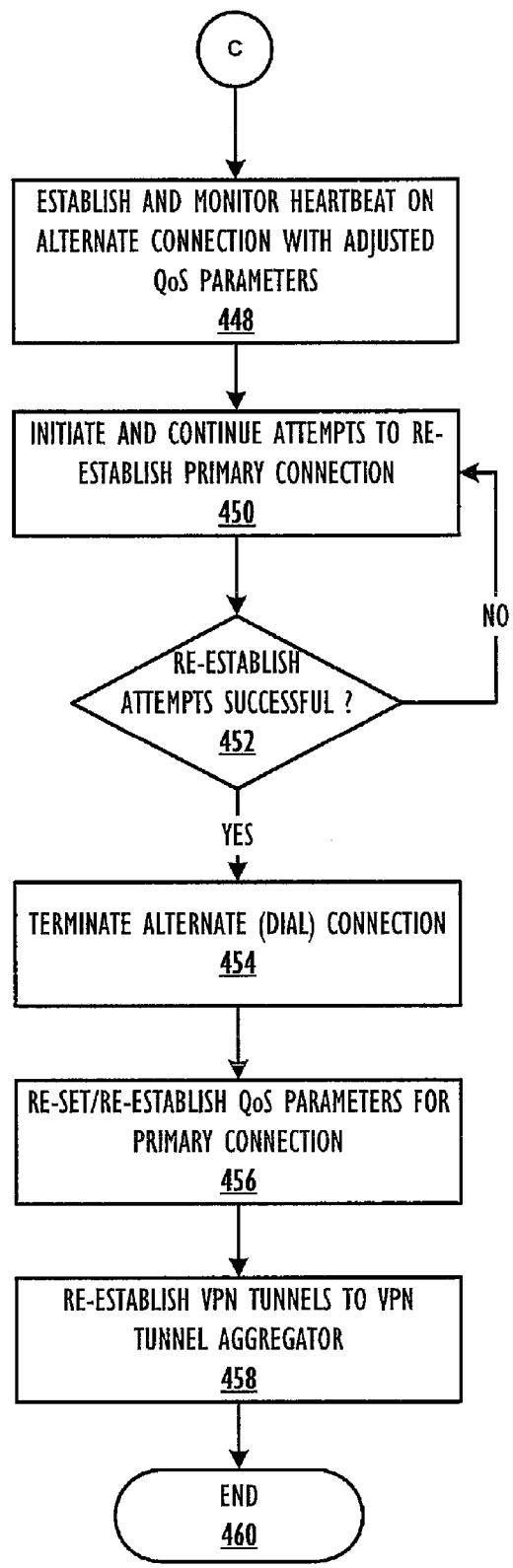

Also illustrated within variable connection QoS diagram 300 is a transfer of heartbeat packets 360 from central monitoring server 170 to NMD 120, which are utilized as described below in the description of FIG. 4. Finally, variable connection QoS diagram 300 also illustrates use of VPN tunnel 190 for connecting VPN client 200 to back office server 340.

The flow chart of FIG. 4, described with reference to components of FIGS. 1-3, illustrates embodiments by which execution of the CDM utility resolves the above listed limitations of the conventional implementations, by providing real-time, intelligent QoS for connecting to the back-office applications. One mechanism by which intelligent QoS is provided is by having the CMD utility periodically check the communication health of the connection and adjust, in real time, the QoS parameters accordingly, to ensure optimal QoS for essential services.

As illustrated by FIGS. 2 and 3, NMD 120 of network 100 is configured to include connectivity detection and management (CDM) subsystem 210, which senses the state of the connection(s) by detecting connection to central monitoring server(s) 170. The method for monitoring the connection begins at block 402 and proceeds to block 404, which depicts receipt of heartbeat packets 360 by NMD 120 from central monitoring server 170. Central monitoring server 170 generates and transmits heartbeat packets 360 on a regular interval to establish a "heartbeat". The interval is pre-established, (e.g., once per minute), and may be dynamically adjusted, such as when required to increase the monitoring frequency, for example.

At decision block 406, a determination is made whether the heartbeat connection has been skipped for a pre-defined threshold number of intervals. If there is no detected skipping of the heartbeat connection for the pre-defined threshold number of intervals, the CDM utility continues to monitor the heartbeat, as shown at block 407. If the heartbeat connection is skipped for the pre-defined threshold number of intervals, the CDM utility 210 attempts to connect NMD 120 to several different servers on the Internet using the primary connection to determine if the primary connection to the Internet through the primary modem 140A has been lost, as shown at block 408. At decision block 410, the CDM utility 210 checks whether the system was able to connect to other servers on the Internet. If the CDM subsystem is able to connect to other servers on the Internet, the CDM utility 210 recognizes/registers that there is a problem with the monitoring server that is generating the heartbeat and no action is taken, as shown at block 412. However, if no connection to other servers can be established, then the CDM utility 210 recognizes/registers/determines that the primary connection (via primary connection device 140A) is lost, as shown at block 414.

At block 416, the CDM utility 210 issues a command to reset the primary modem 140A, and the CDM utility 210 determines at block 418 whether the reset command was successful in re-establishing the connection. If the reset command was successful in re-establishing the connection (determined by checking the heartbeat), then CDM utility re-initiates the QoS for the primary connection and resumes monitoring the heartbeat, as shown at block 403. If the reset of the primary modem fails to re-establish connection, then the CDM utility 210 attempts to establish an alternate connection via an alternate modem, i.e., second connection device 140B, as shown at block 422. At decision block 424, a determination is made whether the alternate connection is to be provided by a dial-backup modem. When the alternate connection is to be provided by a dial-backup modem, the CDM utility 210 accesses a local database 250 of dial-backup numbers, as provided at block 426. The CDM utility 210 goes through the list of stored numbers to establish a local-dial connection, as shown at block 428, and, if as determined at block 430, one of the list of stored numbers successfully completes the local dial connection, the connection is established with the selected one of the stored numbers, at block 434. Otherwise, (assuming all the stored numbers fail to complete the local-dial connection), CDM utility 210 establishes a connection through an "800" number, as shown at block 432.

Upon establishing the alternate connection, the bandwidth of the alternate connection is sensed/determined/detected at block 436 and new QoS policies are activated by the QoS utility 230, at block 438, based on parameters and/or characteristics of the alternate connection and the types of services being supported on the connection. As shown at decision block 440, QoS utility 230 determines whether the bandwidth on the alternate connection is constrained (e.g., a lower than optimal bandwidth for supporting all services). When the bandwidth is constrained, QoS utility 230 triggers the CDM subsystem 210 to constrain non-essential services to use a very small portion of the available bandwidth to ensure that essential services (such as card transactions) have priority, as shown at block 442.

In one embodiment, the first network connection and second network connection are utilized for connecting at least one back office application transmitting a data stream via the Internet using a pre-established back-office application security protocol. Thus, for example, QoS subsystem 230 determines at decision block 444 whether a VPN tunnel needs to be re-established. If a VPN tunnel needs to be re-established, the CDM utility 210 communicates with the VPN client 200 to re-establish the tunnels to the VPN tunnel aggregator 180, as provided at block 446.

The process then moves to block 448 (FIG. 4C) at which the heartbeat of the second/alternate connection is established and monitored, using the real-time adjusted QoS parameters (for routing essential services on the second/alternate connection). With the above described alternate connection operating, the CDM subsystem 210 initiates attempts and continues to attempt to re-establish the primary connection, as shown at block 450. A determination is made at decision block 452 whether the attempts at re-establishment are successful.

When re-establishment of the primary connection is successful, the alternate connection is terminated, as shown at block 454. At block 456, the QoS utility 230 re-sets the QoS parameters for the QoS requirements of the services on the primary connection. Also, at block 458, the VPN client 200 re-establishes VPN tunnels to the VPN tunnel aggregator 180. The process then ends at block 460.

In the flow charts above, one or more of the methods are embodied as a computer program product in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

As an example, in one embodiment, the software aspects of the invention are provided on a computer disk or other portable media, and the functionality of the CDM utility and/or the QoS utility may be loaded unto the respective NMD devices using a computer with I/O support for that medium. The computer program product so provided may be bought off-the shelf as a generic software offering to enhance existing systems. Alternatively, the software may be downloaded from an OEM website or other online source.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system comprising:
   a primary connection device that enables the system to connect to a network, the primary connection device configured to establish a first network connection having at least a first quality of service (QoS) characteristic;
   a second connection device that also enables the system to connect to the network, the second connection device configured to establish a second network connection having at least a second QoS characteristic that is different from the first QoS characteristic, wherein the second network connection is different from the first network connection; and
   a memory that includes instructions, which when the instructions are executed by the system, cause the system to perform:
      detecting a failure of the first network connection to provide communication for at least one essential service with the network; and
      responding to the failure of the first network connection by:
         automatically establishing the second network connection to the network via the second connection device;
         determining the second QoS characteristic of the second network connection;
         determining at least a first QoS parameter based on the second QoS characteristic of the second network connection, wherein the first QoS parameter is associated with the at least one essential service;
         providing communication for the at least one essential service via the second network connection based on the first QoS parameter;
         re-setting the primary connection device; and
         after a reset of the primary connection device re-establishes the first network connection, determining at least a second QoS parameter based on the at least the first QoS characteristic of the first network connection, wherein the at least the second QoS parameter is associated with the at least one essential service.

2. The system of claim 1, wherein the memory further includes instructions, which when executing by the system, cause the system to perform:
   determining that a VPN (virtual private network) tunnel was used to support secure communication of information via the network and the first network connection after detecting the failure of the first network connection; and automatically establishing the VPN tunnel via the network and the second network connection.

3. The system of claim 1, wherein the memory further includes instructions, which when executing by the system, cause the system to perform:
determining a bandwidth of the second network connection;
wherein the second QoS characteristic of the second network connection is associated with the bandwidth of the second network connection.

4. The system of claim 1, further comprising:
a receiver that receives from the network one or more heartbeat packets generated by a server connected to the network; and
wherein the memory further includes instructions, which when executing by the system, cause the system to perform:
receiving, via the receiver, the one or more heartbeat packets;
wherein detecting the failure of the first network connection to provide communication for the at least one essential service with the network includes determining that an elapsed time following receipt of a last received heartbeat packet is longer than a pre-established threshold period of time.

5. The system of claim 1, wherein:
the primary connection device is a first modem that provides a first level of QoS; and
the second connection device is a second modem that provides a second level of QoS below the first level of QoS and which enables real-time adjustment of QoS parameters for applications with data streams traversing the second network connection.

6. The system of claim 1, further comprising:
a device;
wherein the device connects to a server via the network; and
wherein the first network connection and the second network connection are utilized for connecting the device using the at least one essential service and transmitting a data stream associated with the at least one essential service via the network.

7. The system of claim 1, wherein responding to the failure further includes:
providing communication for the at least one essential service via the first network connection based on the at least the second QoS parameter.

8. A computer device comprising:
a processor;
a primary connection interface, coupled to the processor, that enables the computer device to connect to a network, the primary connection interface configured to establish a first network connection having at least a first quality of service (QoS) characteristic;
a second connection interface, coupled to the processor, that also enables the computer device to connect to the network, the second connection interface configured to establish a second network connection with at least a second QoS characteristic that is different from the first QoS characteristic, wherein the second network connection is different from the first network connection;
a memory, coupled to the processor, that includes instructions, which when the instructions are executed by the processor, cause the computer device to perform:
detecting a failure of the first network connection to provide communication for at least one essential service; and
responding to the failure of the first network connection by:
automatically establishing the second connection to the network via the second connection interface;
determining the second QoS characteristic of the second network connection;
determining at least a first QoS parameter based on the second QoS characteristic of the second network connection, wherein the first QoS parameter is associated with the at least one essential service;
providing communication for the at least one essential service via the second network connection based on the at least the first QoS parameter;
determining a bandwidth of the second network connection, wherein the second QoS characteristic of the second network connection is associated with the bandwidth of the second network connection; and
responding to the failure of the first network connection further includes:
re-setting the primary connection interface; and
after a reset of the primary connection interface re-establishes the first network connection, determining at least a second QoS parameter based on the at least the first QoS characteristic of the first network connection, wherein the at least the second QoS parameter is associated with the at least one essential service.

9. The computer device of claim 8, wherein:
the computer device is a device;
the device connects to a server via the network;
the first network connection and the second network connection are utilized for connecting the device using the at least one essential service and transmitting a data stream associated with the at least one essential service via the network;
the primary connection interface includes a first modem that provides first level of QoS;
the second connection interface includes a second modem that provides a second level of QoS below the first level of QoS and which enables real-time adjustment of the at least the second QoS parameter for the at least one essential service.

10. The computer device of claim 8, wherein the memory further includes instructions, which when executed by the processor, cause the computer device to perform:
determining that a VPN tunnel was used to support secure communication of information via the network and the first network connection after detecting the failure of the first network connection; and
automatically establishing the VPN tunnel via the second network connection.

11. The computer device of claim 8, further comprising:
a receiver, coupled to the processor, that receives from the network one or more heartbeat packets generated by a server connected to the network; and
wherein the memory further includes instructions, which when executed by the processor, cause the computer device to perform:
receiving, via the receiver, the one or more heartbeat packets;
wherein detecting the failure of the first network connection includes determining that an elapsed time following receipt of a last received heartbeat packet is longer than a pre-established threshold period of time.

12. A method comprising:
detecting a failure of a first network connection, having at least a first quality of service (QoS) characteristic, to a network; and
responding to the failure of the first network connection by:
   automatically establishing a second network connection, having at least a second QoS characteristic, to the network;
   determining the second QoS characteristic of the second network connection;
   determining at least a first QoS parameter based on the second QoS characteristic of the second network connection, wherein the first QoS parameter is associated with at least an essential service;
   providing communication for the at least the essential service via the second network connection based on the first QoS parameter;
   re-setting a primary connection device associated with the first network connection; and
   after a reset of the primary connection device re-establishes the first network connection, determining at least a second QoS parameter based on the at least the first QoS characteristic of the first network connection, wherein the at least the second QoS parameter is associated with the at least the essential service.

13. The method of claim 12,
wherein a first modem associated with the first network connection provides a first level of QoS; and
wherein a second modem associated with the second network connection provides a second level of QoS below the first level of QoS and which enables real-time adjustment of QoS parameters for applications with data streams traversing the second network connection.

14. The method of claim 12, further comprising:
determining that a VPN tunnel was used to support secure communication of information via the network and the first network connection after detecting the failure of the first network connection; and
automatically establishing the VPN tunnel via the second network connection.

15. The method of claim 12, further comprising:
periodically determining a communication health of the first network connection; and
dynamically re-adjusting QoS considerations for each service supported on the first network connection when the communication health of the first network connection changes.

16. The method of claim 12, further comprising:
receiving one or more heartbeat packets generated by a server connected to the network;
wherein determining the failure includes determining that an elapsed time following receipt of a last received heartbeat packet is longer than a pre-established threshold period of time.

17. The method of claim 12,
wherein the first network connection and the second network connection are utilized for connecting a device using the at least the essential service and transmitting a data stream associated with the at least the essential service via the network to a back server.

18. A computer program product comprising:
a non-transitory computer readable storage medium; and
instructions stored via the tangible computer readable storage medium that when executed by a processor of a processing system cause the processing system to perform:
   detecting a failure of a first network connection, having at least a first quality of service (QoS) characteristic, to a network; and
   responding to the failure of the first network connection by:
      establishing a second network connection, having at least a second QoS characteristic, to the network;
      determining the second QoS characteristic of the second network connection;
      determining at least a first QoS parameter based the second QoS characteristic of the second network connection, wherein the first QoS parameter is associated with at least an essential service; and
   providing communication for at least the essential service via the second network connection based on the first QoS parameter;
   re-setting the primary connection device; and
   after a reset of the primary connection device re-establishes the first network connection, determining, at least, a second QoS parameter based on the least the first QoS characteristic of the first network connection, wherein the at least the second QoS parameter is associated with the at least one essential service.

19. The computer program product of claim 18,
wherein the processing system is a device;
wherein the device connects to a server via the network; and
wherein the first network connection and the second network connection are utilized for connecting the device using the at least the essential service and transmitting a data stream associated with the at least the essential service via the network.

20. The computer program product of claim 18, wherein the instructions, when executed by the processor, cause the processing system to further perform:
determining a VPN tunnel was used to support secure communication of information via the network and the first network connection after detecting the failure of the first network connection; and
automatically establishing the VPN tunnel via the second network connection.

21. The computer program product of claim 18, wherein the instructions, when executed by the processor, cause the processing system to further perform:
periodically determining a communication health of the first network connection;
dynamically re-adjusting QoS considerations for each service supported on the first network connection when the communication health of the first network connection changes; and
receiving one or more heartbeat packets generated by a server connected to the network;
wherein detecting the failure includes determining that an elapsed time following receipt of a last received heartbeat packet is longer than a pre-established threshold period of time.

* * * * *